United States Patent
Leung et al.

(10) Patent No.: US 6,580,432 B1
(45) Date of Patent: Jun. 17, 2003

(54) SPREAD SPECTRUM FIFO AND METHOD FOR STORING DATA FOR MULTIPLE DISPLAY TYPES

(75) Inventors: Charles Y. W. Leung, Markham (CA); Minghua Zhu, North York (CA); David Y. K. Ho, Thornhill (CA); David Chih, Scarborough (CA)

(73) Assignee: ATI International SRL, Christchurch (BB)

( * ) Notice: Subject to any disclaimer, the term of this patent is extended or adjusted under 35 U.S.C. 154(b) by 0 days.

(21) Appl. No.: 09/484,367

(22) Filed: Jan. 14, 2000

(51) Int. Cl.[7] .................................................. G09G 5/36
(52) U.S. Cl. ........................ 345/558; 345/534; 345/573; 713/400; 713/500; 713/600
(58) Field of Search ................................. 345/558, 501, 345/572, 573, 564, 531, 534, 204, 130, 139, 400, 500, 600

(56) References Cited

U.S. PATENT DOCUMENTS

| | | | | |
|---|---|---|---|---|
| 5,488,627 A | * | 1/1996 | Hardin et al. ................ | 375/139 |
| 5,659,339 A | * | 8/1997 | Rindal et al. ................ | 345/212 |
| 5,757,338 A | * | 5/1998 | Bassetti et al. ............. | 345/558 |

OTHER PUBLICATIONS

IEEE International Symposium 1997: Electromagnetic Compatibility: "Design Considerations of Phase–Locked Loop Systems f Spread Spectrum Clock Generation Compatibility" by Hardin et al, pp 302–307, Aug. 18–22, 1997.*

* cited by examiner

Primary Examiner—Kee M. Tung
(74) Attorney, Agent, or Firm—Vedder, Price, Kaufman & Kammholz

(57) ABSTRACT

A FIFO memory device, FIFO control method and graphics processing system are disclosed which incorporate spread-spectrum EMI compensation. In one embodiment, a FIFO memory device and method includes generating a spread-spectrum adjustment signal for a spread-spectrum FIFO based on an address offset associated with a read and write address associated with a spread-spectrum FIFO. The method includes adjusting the spread-spectrum clock signal in response to the spread-spectrum adjustment signal based on the address offset associated with the read and write address. A spread-spectrum FIFO receives data from a data source, such as a graphics data source, which may include a memory such as a RAMDAC. The data can be provided by a display engine or other suitable information provider. The spread-spectrum FIFO is operatively responsive to both a spread-spectrum clock signal and another clock signal to suitably adjust an output frequency of data read from the spread-spectrum FIFO using fewer than two complete display paths and associated circuitry and operations.

13 Claims, 4 Drawing Sheets

SPREAD SPECTRUM FIFO AND METHOD FOR STORING DATA FOR MULTIPLE DISPLAY TYPES

FIELD OF THE INVENTION

The invention relates generally to spread-spectrum based EMI protection devices and methods and more particularly to FIFO memories with spread-spectrum protection.

BACKGROUND OF THE INVENTION

Electromagnetic interference (EMI) has become a growing problem in today's computers and other processing devices including portable Internet appliances and many other processing devices in part due to the higher operating frequencies. In addition, integrated circuits are combined on motherboards, and the additional EMI generated by differing components may have an additive effect. High speed busses, clock generators and other circuits can be the cause of EMI.

One technique for controlling EMI for a graphics processing system and other processing systems, may include the positioning of EMI containment shields over certain circuits. Also, metal housings are used to reduce the amount of EMI radiated from an integrated circuit or integrated circuit subsystem.

Alternatives to shielding techniques include pulse shaping, slew rate control, staggered outputs and spread-spectrum techniques. Examples of such techniques are described, for example, in an article entitled "Use spread-spectrum techniques to reduce EMI" authored by Steve Bolger and Samer Omar Darwish, Integrated Circuit Systems, published in 1998, by Reed Elsevier Inc. and incorporated herein by reference.

The U.S. Federal Communications Commission requires electronic devices to provide minimum EMI so that surrounding devices are not improperly affected. Spread-spectrum EMI reduction typically involves the use of a jitter clock that varies the frequency of data about a range to decrease the magnitude of a maximum energy at any given frequency. This is typically done by controlling the frequency of a jitter clock. Spread-spectrum clock generators can typically generate two spread-spectrum clocks, such as a center spread spectrum clock and a downspread spectrum clock based on a selection of a mode input, if desired. One type of spread-spectrum modulation sometimes referred to as "center spread modulation" shifts the frequency of a data above and below an original fundamental frequency. One advantage of this modulation is that the average system frequency always be the same. Another technique, sometimes referred to as "downspread modulation", requires a shifting of the carrier frequency down by half of the modulation amount so that the modulate away form is centered on the new carrier. Accordingly, the peak of the modulation is at the original carrier level. One advantage of downspreading is that is can insure that a system does not exceed the maximum processor's clock speed.

In graphics processing systems, it is known to use spread spectrum EMI control for digital information that is provided to a digital display. Typically, if two display devices can be driven by a graphics processing system, one display engine path is typically used to provide information to an analog display device whereas another display engine path is used to provide display information for a digital device, such as an LCD display device. The two display engines can be used to display data simultaneously on two different displays. For example, one display engine can display graphics and video on an LCD display whereas a different image, such as a television program, can be displayed on an analog computer screen. The display information for the LCD display device may be sent using spread-spectrum EMI techniques which jitter the clock to the display engine for the display device. However, a problem arises since there are typically two display engines required for two different types of displays. Accordingly, such graphics processing systems can be quite costly. For example, one RAMDAC may be used for each processing path since the bit rates can be different. In addition, if one of the display engines has less functionality than another of the display engines, the graphics processing system can be limited in operation. For example, if only one engine can operate in VGA mode, the same image cannot be shown on two displays. This splitting of display engine capabilities can limit the operational capabilities of the processing system.

Accordingly, a need exists for a graphics processing system and method that provides spread-spectrum FIFO memory to provide a more efficient graphics processing system, or other type of information processing system.

DETAILED DESCRIPTION OF A PREFERRED EMBODIMENT OF THE INVENTION

A FIFO memory device, FIFO control method and graphics processing system are disclosed which incorporate spread-spectrum EMI compensation. In one embodiment, a FIFO memory device and method includes generating a spread-spectrum adjustment signal for a spread-spectrum FIFO based on an address offset associated with a read and write address associated with a spread-spectrum FIFO. The method includes adjusting the spread-spectrum clock signal in response to the spread-spectrum adjustment signal based on the address offset associated with the read and write address. A spread-spectrum FIFO receives data from a data source, such as a graphics data source, which may include a memory such as a RAMDAC. The data can be provided by a display engine or other suitable information provider. The spread-spectrum FIFO is operatively responsive to both a spread-spectrum clock signal and another clock signal to suitably adjust an output frequency of data read from the spread-spectrum FIFO using fewer than two complete display paths and associated circuitry and operations.

In one embodiment, a graphics processing system uses a first and second display transmitter wherein one of the display transmitters is operatively responsive to the spread-spectrum clock signal and receives data from the spread-spectrum FIFO based on the spread-spectrum clock signal. The other display data transmitter is operatively responsive to a different clock signal and also receives data from the graphic data source. In addition, if desired, the second display data transmitter may also receive unjittered data from the graphics data source.

Figure 1:
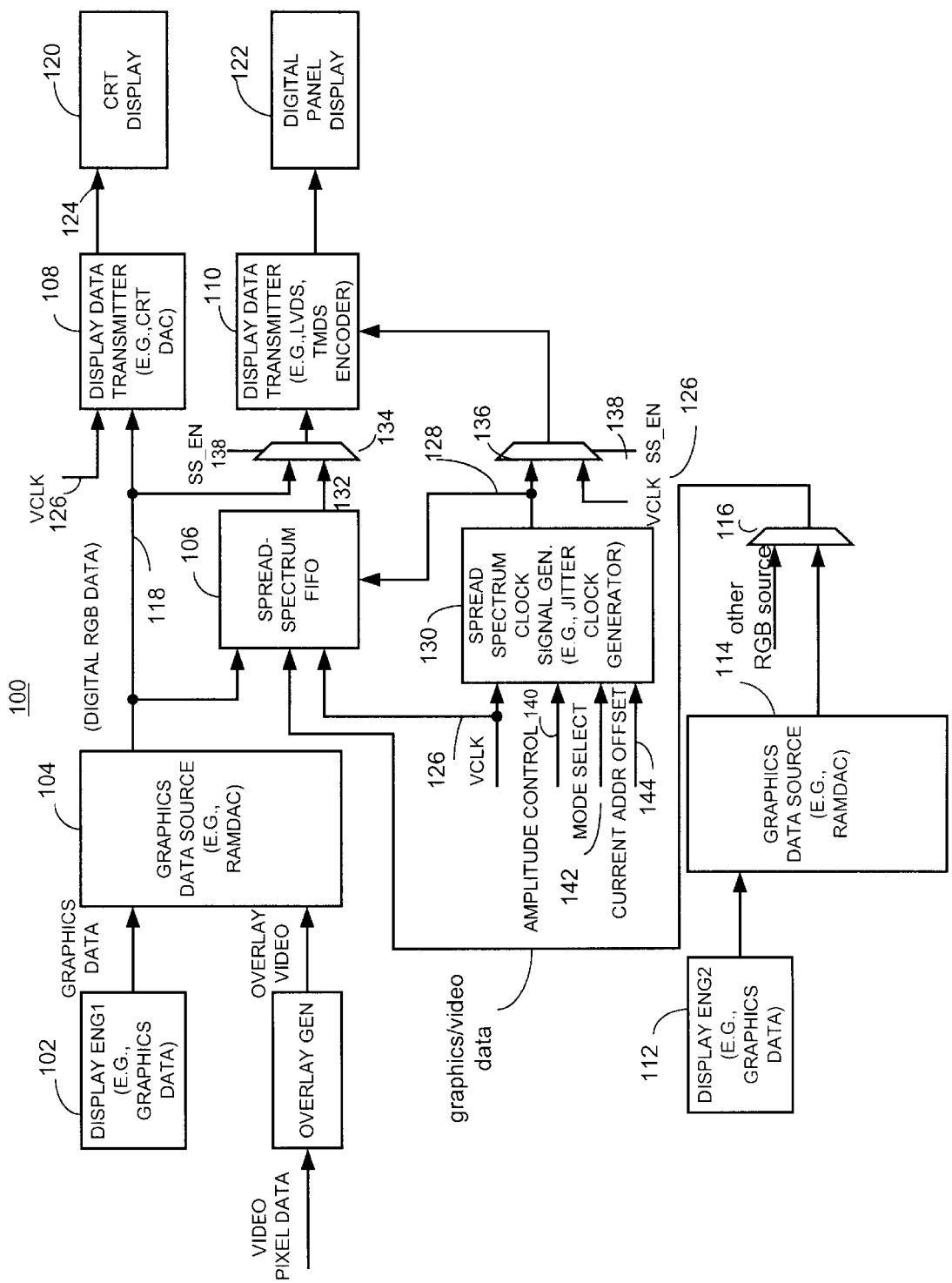
FIG. 1 is a block diagram illustrating one example of a graphics processing system in accordance with one embodiment of the invention.

FIG. 1 illustrates one example of a graphics processing system 100 that includes a display engine 102, a graphics data source 104, such as a RAMDAC, a spread-spectrum FIFO 106, a first display data transmitter 108 and a second display transmitter 110. By way of example, and not limitation, the graphics processing system 100 may be incorporated as one or more video graphics processing chips that may be placed on a motherboard or, if desired, may be incorporated as part of a system on a chip integrated solution that may also include a central processing unit or other processing devices. Where a second display engine path is desired, another display engine 112 may be used in addition to another graphics data source 114 and multiplexer 116. The FIFO can be applied to the secondary display engine in the same way as the with the primary display engine. For example, the FIFO can be made switchable between a primary or secondary display engine. Alternatively, a separate FIFO can be instantiated for the secondary display engine.

The graphics data source 104 is operatively coupled to provide data 118 for display on a plurality of display devices 120 and 122. For example, display device 120 may be an analog cathode ray tube (CRT) type device, whereas the display device 122 may be a digital display device, such as a flat panel LCD or other suitable digital display device, as known in the art. The first display data transmitter 108 may be, for example, a CRT digital analog converter which receives the data 118 and converts it to analog display signals 124, as known in the art. The first display data transmitter 108 is operatively responsive to a first clock signal 126 (VCLK) and also receives the data 118 from the graphics data source 104. The spread-spectrum FIFO 106 is operatively responsive to at least both a spread-spectrum clock signal 128 (VCLKSS) and the first clock signal 126. The spread-spectrum clock signal 128 is generated by a jitter clock generator 130 that may be integrated as part of the spread-spectrum FIFO 106 or may be an external circuit, if desired. The spread-spectrum FIFO 106 outputs spread data 132 to a multiplexer 134. Another multiplexer 136 receives both the clock signal 126 and the spread-spectrum clock signal 128. The multiplexers 134 and 136 are controlled through a spread-spectrum enable signal 138 so that the second display data transmitter 110 can provide either spread data 132 or data 118 to the second display 122. When EMI protection is used, the multiplexers 134 and 136 are controlled so that the spread-spectrum enable signal 138 allows the spread-spectrum clock signal 128 to be used by the second display data transmitter 110 and so that the spread data 132 is received by the second display data transmitter 110.

The jitter clock generator 130 serves as the spread-spectrum clock generator and receives an amplitude control signal 140, a mode select signal 142 and a current address offset value 144. The mode select signal 142 allows the jitter clock generator to provide a center spread or downspread spread-spectrum clock signal 128 to the spread-spectrum FIFO and second display data transmitter 110.

The first and second display data transmitters 108 and 110 are operative to be coupled with different display devices 120 and 122 to provide the requisite analog or digital information. Each of the first and second display data transmitters 108 and 110 receive the same data 118 from a graphics data source 104 to provide, if desired, simultaneous display of the data over two different display devices.

The second display data transmitter 110 may be a format converter that converts, for example, digital RGB data to an LVDS format, a TMDS format, or any other suitable digital protocol if desired. As further set forth below, the spread-spectrum clock generator 130 adjusts the spread-spectrum clock signal 128 in response to a spread-spectrum adjustment signal that is based upon the address offset value 144 associated with a read and write address of the spread-spectrum FIFO 106. The spread-spectrum FIFO 106 in conjunction with the spread-spectrum clock generator 130 facilitates the passing of data and control signals from an unjittered domain to a jittered domain. Preferably, the spread-spectrum FIFO 106 is inserted in a display path at a point where data is split to the analog and digital output encoders, namely, the first and second display data transmitters 108 and 110. In this way, other processing circuitry and associated features that are present before the data splitting occurs, can be shared between both types of display devices 120, 122. The use of the spread-spectrum FIFO 106 with a single display path can further allow a reduction in circuit complexity and die size.

Figure 2:
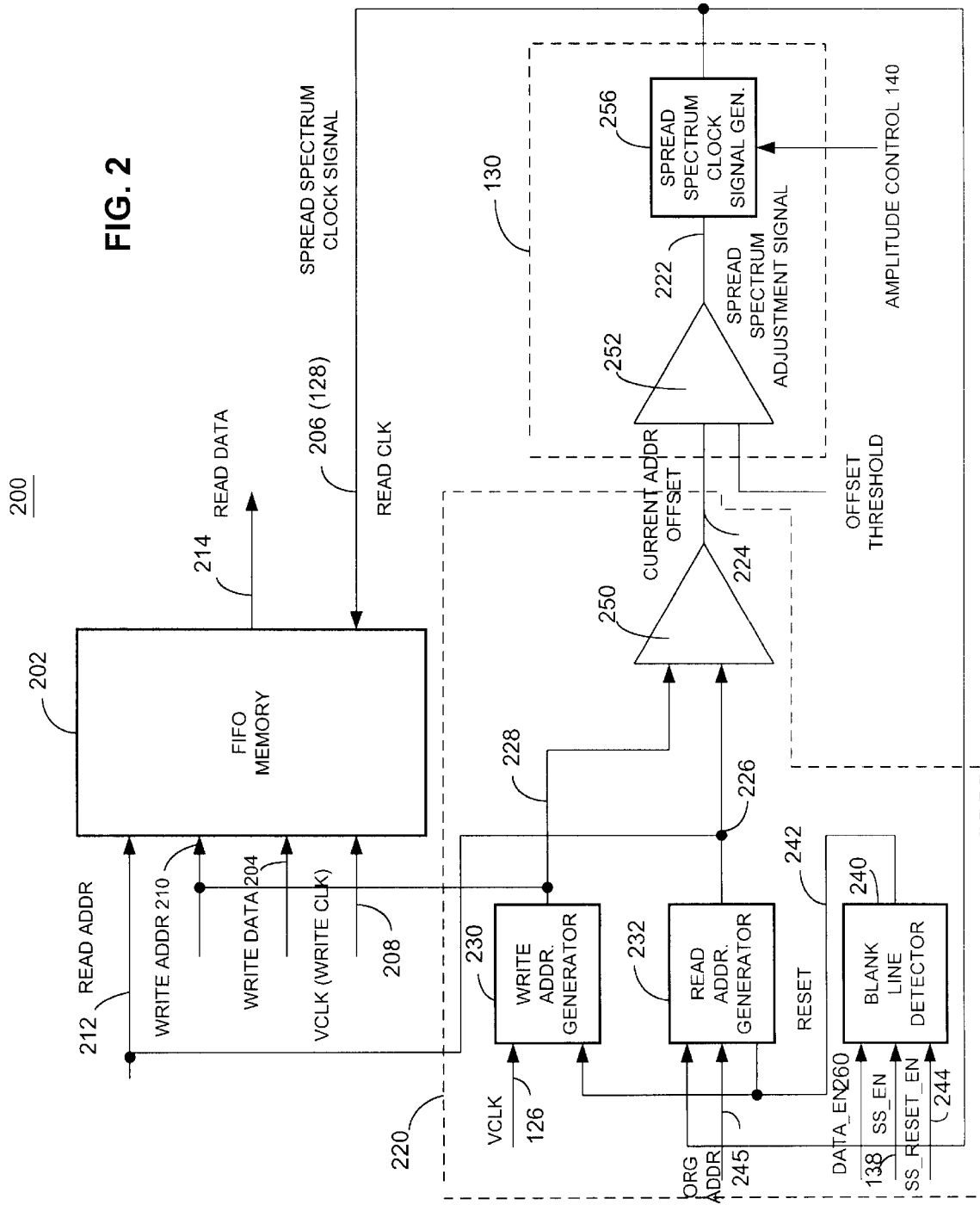
FIG. 2 is a block diagram illustrating one example of a FIFO memory device in accordance with one embodiment of the invention.

FIG. 2 illustrates one example of a FIFO display device 200 that includes FIFO memory 202, a data input port 204, a spread-spectrum read clock input 206, a write clock input 208, a write address port 210, a read address port 212 and a data output port 214. Data 118 is received through the data input port 204 and is output to the data output port 214 based on the spread-spectrum read clock input 206 (i.e., the spread-spectrum clock signal 128) to provide data synchronizers spread-spectrum transmission by the second display data transmitter 110.

The FIFO memory device 200 also includes spread-spectrum FIFO control logic 220 which is operative to generate a spread-spectrum adjustment signal 222, based on an address offset 224, such as a current offset, associated with a read address 226 (i.e. address 212) and a write address 228 associated with the spread-spectrum FIFO memory 202. The spread-spectrum adjustment signal 222 may be one or more bits such as the adjustment value 144. The FIFO control logic 220 includes a spread-spectrum FIFO write address generator 230 that is operatively responsive to generate the FIFO write address 228 for the write address port 210 in response to the first clock signal 126 (208). The FIFO control logic 220 also includes a spread-spectrum read address generator 232 that is operatively responsive to generate the FIFO read address 226 for the read address port 212 in response to the spread-spectrum clock signal 128 (i.e., a spread-spectrum read clock input 206).

The FIFO control logic 220 also includes a FIFO address reset circuit 240 which is operative to reset a FIFO write address and a FIFO read address, such as read address 226 and write address 228, in response to detecting a blank between scan lines. A reset signal 242 may be generated between each scan line. For example, if a downspread mode is required as indicated by a spread-spectrum reset enable signal 244 which serves as the mode select signal 142 to indicate whether, for example, a center spread or downspread spectrum is required, the addresses are reset when the FIFO control logic detects that a downspread mode is desired. The reset signal 242 prevents the FIFO from overflowing. The overflow is caused by an inherent nature of a downspread clock, which has a lower average frequency than its unjittered counterpart. If the FIFO receives less read clocks 206 than write clocks 204 on the average, then the FIFO will inevitably overflow. This will not be the case for centerspread, because the average frequency of a center-spread clock is the same as its unjittered counterpart. The FIFO address reset circuit 240 is responsive to a type of spread-spectrum clock signal being used, namely, whether a downspread or center spread spread-spectrum clock signal 128 is being generated.

By way of example, and not limitation, the spread-spectrum FIFO write address generator 230 includes a counter and the spread-spectrum FIFO read address generator 232 includes a counter. The write address generator 230 increments upon each of the first clock signal whereas the read address counter increments on each spread-spectrum clock signal 128. The read address generator 232 receives an original address value (ORG).

The FIFO control logic 220 also includes a first comparator 250 and a second comparator 252. The first comparator 250 is operatively responsive to the FIFO write address 228 and the FIFO read address 226 and compares the address values to generate a current address offset value 144 in the form of the address offset 224. The current address offset value 144 is then compared by the second comparator 225 to an offset threshold 254 that may be selected, for example, to insure that a suitable range of address spacing in the FIFO memory is selected as described below. The offset threshold 254 is selected depending on the response time of the spread spectrum clock signal generator 256. If the generator 256 has a slow response, then the offset threshold 254 should be set to a small value so that an adjustment will take place earlier (as opposed to later on when the FIFO is near overflow/underflow). The second comparator 252 is operatively responsive to the current address offset value 144 to generate the spread-spectrum clock adjustment signal 222 which indicates the amount of spread-spectrum adjustment that is required for a spread-spectrum clock generator 256. The spread-spectrum clock generator 256 outputs the spread-spectrum clock signal 128 (206) which may be varied based on the spread-spectrum adjustment signal 222. The jitter clock generator accordingly adjusts the spread-spectrum clock signal 128 if the current offset of the read and write addresses is beyond an allowable address spacing threshold which is required to avoid overwriting of data in the FIFO memory due to too much drifting of the spread-spectrum clock signal 206. The amplitude control 140 is usually available as an input through a control register. Its value is usually determined by experimentation. It is usually set to the lowest setting that allows the product to reliably pass EMI certification tests.

Figure 3A:
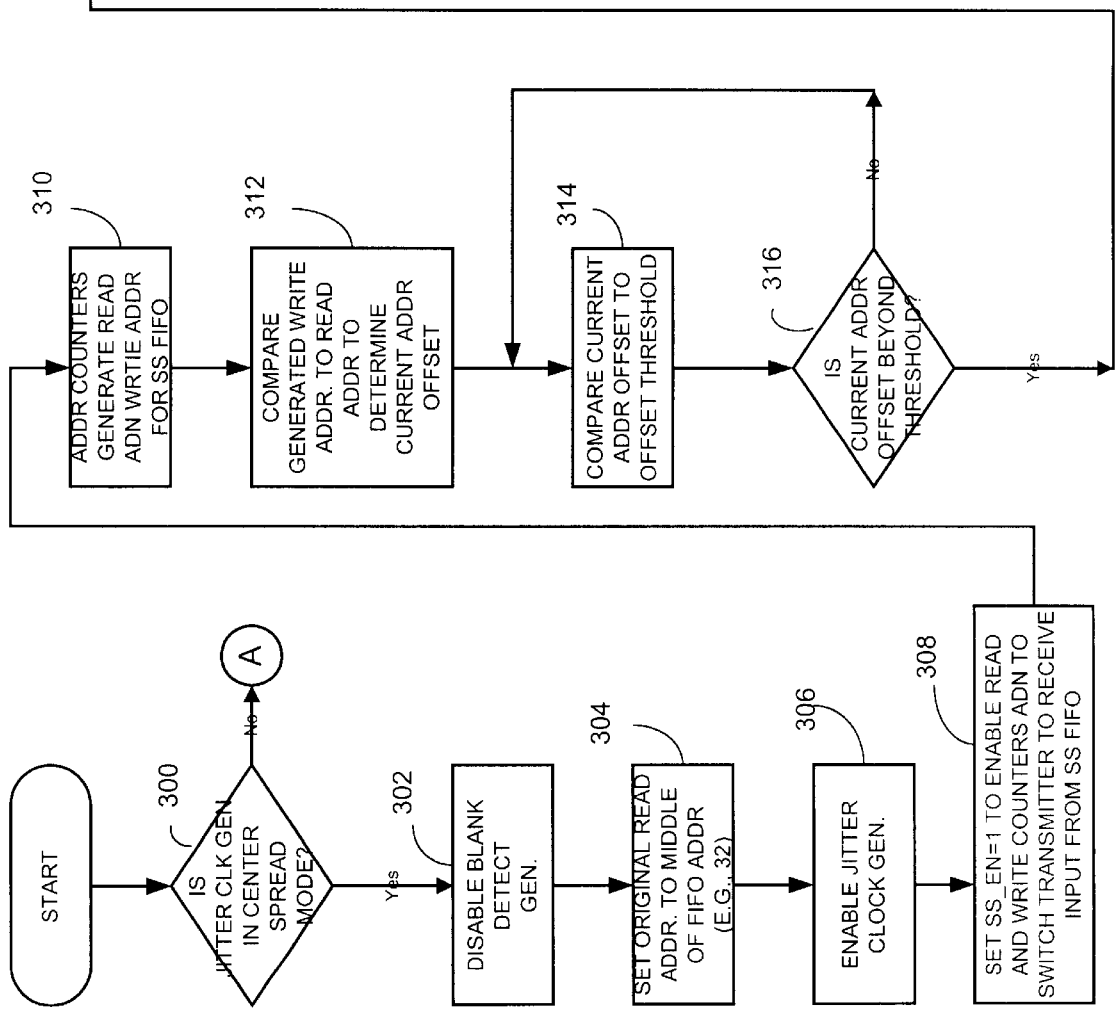
FIGS. 3a–3b illustrate a flowchart setting forth one example of the operation of the FIFO memory device in accordance with one embodiment of the invention.
Figure 3B:
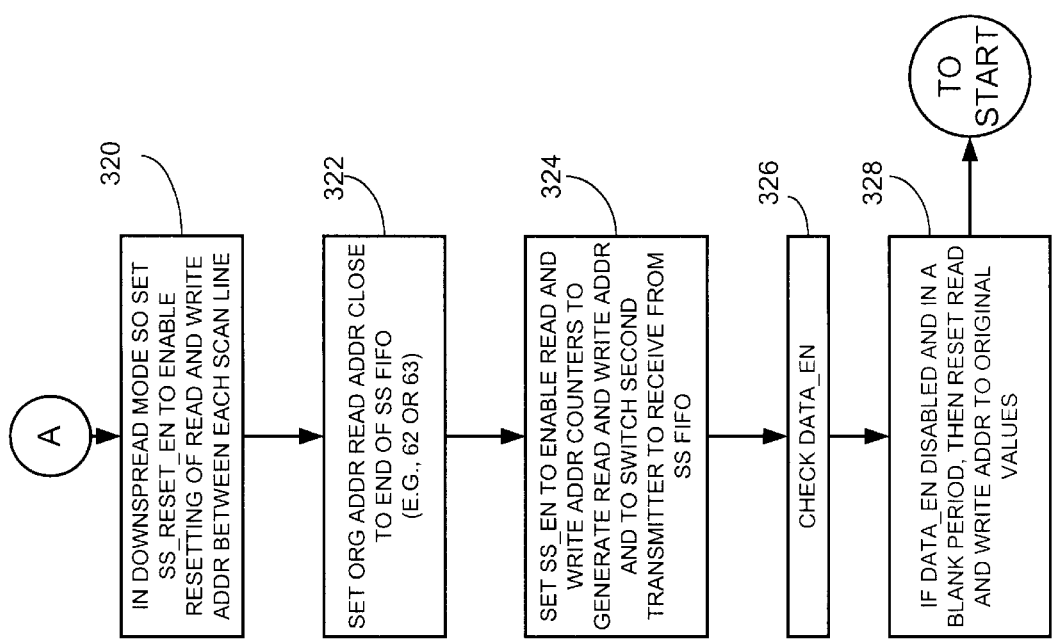

Referring to FIGS. 3a and 3b, one method of operation of the FIFO memory device 200 will be described. Generally, the method includes generating the spread-spectrum adjustment signal for the spread-spectrum FIFO memory 202 based on an address offset associated with a read and write address of the spread-spectrum FIFO memory. The method includes adjusting the spread-spectrum clock signal 128 in response to the spread-spectrum adjustment signal 222 based on the address offset 224. As shown in block 300, the method includes determining if the jitter clock generator 130 is in the center spread mode as indicated, for example, by the mode select value 142 which may be represented as the spread-spectrum reset enable signal 244 However, the mode select value is usually an input, so it is can be assumed to be available directly. As shown in block 302, if the jitter clock generator 130 is selected to be in the center mode as selected by a user through a GUI interface or other suitable selection mechanism. The capability of the spread spectrum clock generator 256 determines what mode of spread spectrum is available. Users may have a preference of what mode they wish to employ. The method includes disabling the blank line detection generator 240. For example, this reset mechanism is useful when the average frequency between the jittered clock and its unjittered counterpart is different; it is not useful in the true center mode (when the average frequencies are exactly the same). As shown in block 304, the method includes setting an original read address (ORG) to a middle location of the FIFO memory 202. The original read address is indicated as 245. For example, if the FIFO memory is sixty-four entries long, the original read address 245 may be set to location thirty-two. The process then includes enabling the jitter clock generator, as shown in block 306, to provide the suitable spread-spectrum clock signal 128.

The method includes, as shown in block 308, setting the spread-spectrum enable signal 138 to enable the write address generator and read address generator to switch the second display data transmitter 110 to receive input from the spread-spectrum FIFO 106. As shown in block 310, the method includes generating the read and write addresses 226 and 228. For example, the read address generator increments the counter based on the original read address which is then compared to the write address generator value which may have started at zero and now indicates a "1" as representing the first entry of the FIFO memory 202.

As shown in block 312, the method includes comparing the generated write address 228 to the read address 226 to determine a current address offset. The method also includes, as shown in block 314, comparing the current offset to the offset threshold 254. If the current offset is beyond the offset threshold as indicated in block 316, the method includes generating the spread-spectrum adjustment signal 222 to suitably adjust the spread-spectrum clock signal 128 as shown in block 318. The adjustment continues as desired. If the current address offset 224 is compared and is larger than the allowable offset threshold, then the read clock is falling behind the write clock. Thus the adjustment signal will indicate that the spread spectrum clock should increase in frequency.

Referring back to block 300, if the jitter clock generator is selected to be in the downspread mode, the method includes, as shown in block 320, setting the spread-spectrum reset enable 244 to enable the resetting of the read and write addresses between each scan line through the generation of reset signal 242. As shown in block 322, the method includes setting the original read address close to an address at the end of the spread-spectrum FIFO. For example, the original address 245 may be set at sixty-two or sixty-three if there are sixty-four entries for the spread-spectrum FIFO. Since the apparatus is in the downspread mode, the read clock is never faster then the write clock, the write address will gradually increase relative to the read address. Setting the read address close to the maximum insures that the possibility of an overflow is minimized.

As shown in block 324, the method includes setting the spread-spectrum enable signal 138 to enable the read and write address generators 230 and 232 and to switch the second display data transmitter 110 to receive input from the spread-spectrum FIFO. As shown in block 326, the method includes checking the data enable line 260. As shown in block 328, if the data enable line 260 is disabled in a blank scan line period, the method includes resetting the read and write addresses 228 and 226 to original values. This ensures that any read-write address offset accumulated over a scan line is cleared. The process then continues as required. Without the reset, since the write address is almost always faster than the read address, the FIFO is bound to overflow. After initialization, the process is continuous and the method includes continuing to check the data_en.

Hence, the method includes generating the FIFO write address 228 in response to the first clock signal 126 and generating the read address in response to the spread-spectrum clock signal. The address offset 224 may be generated as a current address offset value 144 based on the FIFO write address and FIFO read address 226 and 228. Accordingly, a spread-spectrum FIFO is disclosed for providing data for multiple and different display devices by providing spread-spectrum EMI protection. Other advantages will be recognized by those of ordinary skill in the art.

It should be understood that the implementation of other variations and modifications of the invention in its various aspects will be apparent to those of ordinary skill in the art, and that the invention is not limited by the specific embodiments described. It is therefore contemplated to cover by the present invention, any and all modifications, variations, or equivalents that fall within the spirit and scope of the basic underlying principles disclosed and claimed herein.

What is claimed is:

1. A FIFO control method comprising:

generating a spread spectrum adjustment signal for a spread spectrum FIFO based on an address offset associated with a read and write address associated with the spread spectrum FIFO; and adjusting a spread spectrum clock signal in response to the spread spectrum adjustment signal based on the address offset associated with a read and write address associated with the spread spectrum FIFO.

2. The FIFO control method of claim 1 including:

generating a FIFO write address in response to a first clock signal; and generating a FIFO read address in response to the spread spectrum clock signal.

3. The FIFO control method of claim 2 including generating the address offset as a current address offset value in response to the FIFO write address and to the FIFO read address.

4. The FIFO control method of claim 1 including detecting a blank period between scan lines and resetting a FIFO write address and a FIFO read address in response to detecting the blank period between scan lines.

5. The FIFO control method of claim 4 including the step of resetting the FIFO write address and FIFO read address based on a type of spread spectrum clock signal being used.

6. A graphics processing system comprising:

graphics data source operatively coupled to provide data for display on a plurality of display devices;

a first display data transmitter, operatively responsive to a first clock signal and operatively coupled to receive data from the graphics data source;

a spread spectrum FIFO operatively responsive to at least both a spread spectrum clock signal and to the first clock signal;

a second display data transmitter, operatively responsive to the spread spectrum clock signal and operatively coupled to receive data from the spread spectrum FIFO based on the spread spectrum clock signal; and spread spectrum FIFO control logic operative to generate a spread spectrum adjustment signal based on an address offset associated with a read and write address associated with the spread spectrum FIFO.

7. A graphics processing system comprising:

graphics data source operatively coupled to provide data for display on a plurality of display devices;

a first display data transmitter, operatively responsive to a first clock signal and operatively coupled to receive data from the graphics data source;

a spread spectrum FIFO operatively responsive to at least both a spread spectrum clock signal and to the first clock signal;

a second display data transmitter, operatively responsive to the spread spectrum clock signal and operatively coupled to receive data from the spread spectrum FIFO based on the spread spectrum clock signal; and a spread spectrum clock generator that produces the spread spectrum clock signal for the spread spectrum FIFO and the second display data transmitter;

wherein the spread spectrum clock generator is operatively responsive to adjust the spread spectrum clock signal in response to a spread spectrum adjustment signal based on an address offset associated with a read and write address associated with the spread spectrum FIFO.

8. A graphics processing system comprising:

graphics data source operatively coupled to provide data for display on a plurality of display devices;

a first display data transmitter, operatively responsive to a first clock signal and operatively coupled to receive data from the graphics data source;

a spread spectrum FIFO operatively responsive to at least both a spread spectrum clock signal and to the first clock signal;

a second display data transmitter, operatively responsive to the spread spectrum clock signal and operatively coupled to receive data from the spread spectrum FIFO based on the spread spectrum clock signal;

a spread spectrum FIFO write address generator operatively responsive to generate a FIFO write address in response to the first clock signal;

a spread spectrum FIFO read address generator operatively responsive to generate a FIFO read address in response to the spread spectrum clock signal; and a first comparator operatively responsive to the FIFO write address and to the FIFO read address to generate a current offset value.

9. The graphics processing system of claim 8 including a second comparator operatively responsive to the current offset value to generate a spread spectrum clock adjustment signal.

10. A FIFO memory device comprising:

memory;

a data input port operatively coupled to the memory;

a data output port operatively coupled to the memory;

a spread spectrum read clock input;

a write clock input;

a spread spectrum clock generator that produces a spread spectrum clock signal that is input through the spread spectrum read clock input; and spread spectrum FIFO control logic operative to generate a spread spectrum adjustment signal based on an address offset associated with a read and write address associated with a spread spectrum FIFO;

wherein data received through the data input port is output through the data output port based on the spread spectrum read clock input to provide data synchronized for spread spectrum transmission by a display data transmitter.

11. The FIFO memory device of claim 10 wherein the spread spectrum clock generator is operatively responsive to adjust the spread spectrum clock signal in response to a spread spectrum adjustment signal based on an address offset associated with a read and write address associated with the spread spectrum FIFO.

12. A FIFO memory device comprising:

memory;

a data input port operatively coupled to the memory;

a data output port operatively coupled to the memory;

a spread spectrum read clock input;

a write clock input;

a spread spectrum FIFO write address generator operatively responsive to generate a FIFO write address in response to a first clock signal;

a spread spectrum FIFO read address generator operatively responsive to generate a FIFO read address in response to a spread spectrum clock signal; and a first comparitor operatively responsive to the FIFO write address and to the FIFO read address to generate a current offset value;

wherein data received through the data input port is output through the data output port based on the spread spectrum read clock input to provide data synchronized for spread spectrum transmission by a display data transmitter.

13. The FIFO memory device of claim 12 including a second comparator operatively responsive to the FIFO write address and to the FIFO read address to generate a current offset value.

* * * * *